United States Patent [19]

Ohta et al.

[11] Patent Number: 5,416,467
[45] Date of Patent: May 16, 1995

[54] SECURITY SYSTEM UTILIZING LOOSELY CONTAINED OPTICAL FIBER

[75] Inventors: Junichi Ohta; Toshinori Wakami; Kazuhiro Okamoto, all of Kanagawa; Ryusuke Miki; Yoshiaki Kanbe, both of Osaka, all of Japan

[73] Assignees: Sumitomo Electric Industries, Ltd., Osaka; Matsushita Electric Works, Ltd., Kadoma, both of Japan

[21] Appl. No.: 868,890

[22] Filed: Apr. 16, 1992

[30] Foreign Application Priority Data

Apr. 16, 1991 [JP] Japan ................... 3-084151
Apr. 7, 1992 [JP] Japan ................... 4-084294

[51] Int. Cl.$^6$ ............................................. G08B 13/18
[52] U.S. Cl. ................................. 340/555; 340/541; 340/668
[58] Field of Search ............... 340/541, 555, 550, 668; 385/12-13

[56] References Cited

U.S. PATENT DOCUMENTS

| | | | |
|---|---|---|---|
| 4,676,485 | 6/1987 | Ciordinik et al. | 340/550 X |
| 4,680,573 | 7/1987 | Ciordinik et al. | 340/541 |
| 4,701,614 | 10/1987 | Jaeger et al. | 250/227 |
| 4,777,476 | 10/1986 | Dank | 340/541 |
| 4,829,286 | 5/1989 | Zvi | 340/541 |

FOREIGN PATENT DOCUMENTS

| | | |
|---|---|---|
| 0196510 | 10/1986 | European Pat. Off. . |
| 0246487 | 11/1987 | European Pat. Off. . |
| 2148506 | 9/1979 | France . |
| 2494452 | 5/1982 | France . |
| 2551253 | 3/1985 | France . |
| 2583528 | 12/1986 | France . |
| 60-049200 | 7/1985 | Japan . |
| 60-100003 | 10/1985 | Japan . |
| 2158963 | 11/1963 | United Kingdom . |
| 2039683 | 8/1980 | United Kingdom . |
| 2123164 | 1/1984 | United Kingdom . |
| 2174822 | 11/1986 | United Kingdom . |
| 2179072 | 2/1987 | United Kingdom . |
| 2187305 | 9/1987 | United Kingdom . |

*Primary Examiner*—Brent Swarthout
*Assistant Examiner*—Thomas J. Mullen, Jr.
*Attorney, Agent, or Firm*—Cushman, Darby & Cushman

[57] ABSTRACT

A security system, including a cable having a groove formed in the inside thereof to accommodate therein an optical fiber with an excessive length, a plurality of supports having mandrels to support the optical cable so as to provide a fence, a light transmitter to inject light into one end of the optical cable and a light receiver to detect the light projecting out of the other end of the optical cable so that any transmission loss through the optical cable due to an intrusion of the fence may be measured. The cable is formed so that when tension is applied to the optical cable, a transmission loss is detected. The resulting system has a threshold capability which distinguishes valid from false intrusions.

18 Claims, 5 Drawing Sheets

SECURITY SYSTEM UTILIZING LOOSELY CONTAINED OPTICAL FIBER

BACKGROUND OF THE INVENTION

1. Field of the Invention

The present invention relates to a security system using an optical fiber barrier for detecting an invader breaking into an area surrounded by the barrier.

2. Prior Art

Conventionally, as a security system, employed are an infrared camera, a system using infrared rays, or a method of transmitting an optical signal through an optical fiber.

An area which can be watched by one unit of such an infrared camera, a system using infrared rays, or the like, has a limit, resulting in difficulty to watch a wide area. On the other hand, a conventional system using an optical fiber is used to detect whether the optical fiber is cut or not by a person. However, in these systems, repair has usually been required to recover the system, and a large amount of optical fiber is required so that the person cannot invade an area surrounded by the optical fiber without cutting the optical fiber.

SUMMARY OF THE INVENTION

An object of the present invention is to solve the above problems accompanying the conventional systems, and to provide a security system in which a wide area can be watched without optical fiber being damaged.

In order to solve the above problems, the present invention provides a security system which comprises an optical cable having at least one gap formed in the inside thereof so as to accommodate therein an optical fiber with a length in excess of the minimum lineal length of fiber which could be used; a fence on which one or more lines of the optical cable are provided between supports containing mandrels, which provides support for the optical cable by winding around the mandrels; and a light transmitter for injecting light into one end of the optical fiber and a light receiver for receiving the light projecting out of the other end thereof to detect the transmission loss of an optical signal, wherein the optical cable is formed so that when predetermined tension is exerted to the optical cable, a predetermined transmission loss of the optical signal is generated in the optical cable.

DETAILED DESCRIPTION OF THE PREFERRED EMBODIMENTS

Embodiments of the present invention will be described with reference to the accompanying drawings.

Figure 1:
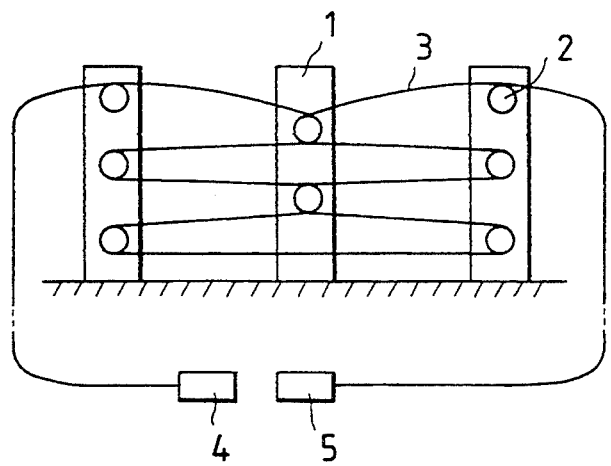
FIG. 1 shows an explanatory view of the whole configuration of the present invention.
Figure 2:
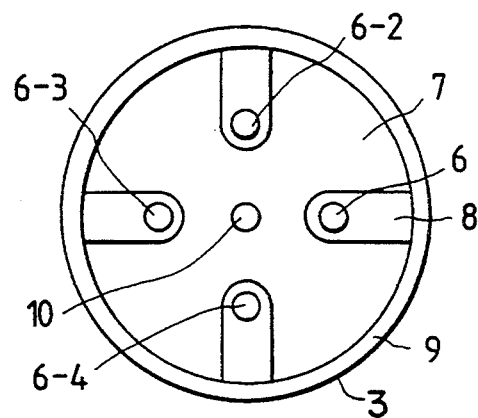
FIG. 2 shows a sectional view of an optical cable applied to the present invention.

In FIGS. 1 and 2, an optical cable 3 is provided with gaps 8 therein, which accommodates optical fibers 6, 6-2, 6-3, and 6-4 with an excessive length. A plurality of supports 1 are provided with a plurality of mandrels 2 in such a manner that one or more lines of the optical cable 3 are arranged between the supports 1 while winding around the mandrels 2 to form a fence. A light transmitter 4, injects light into one end of the optical cable 3, and a receiver 5 receives the light from the other end thereof.

The optical cable 3 is formed in such a manner that the optical fiber 6 is received in the gap 8 which is in the form of a linear or spiral groove provided in a surface of a cylindrical body 7, and a cover layer 9 is provided over the cable 3.

The cylindrical body 7 is made of reinforced plastics including glass fibers, but a copper wire 10 may be used at a center of the cylindrical body 7 for increasing tensile strength.

Figure 3:
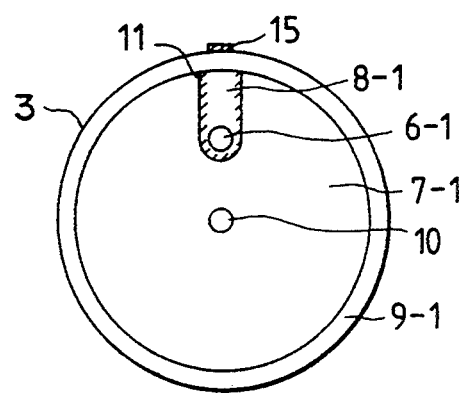
FIG. 3 shows a sectional view of another optical cable applied to the present invention.

The cover layer 9 is made of resin such as polyethylene, nylon, or the like. As shown in FIG. 3, a rough surface 11 is provided on an inner wall of the groove 8 so that microbend is easily generated in the optical fiber 6 when tension is exerted on the optical cable 3 which is bent by the mandrels 2.

It is preferable to provide three or more grooves 8 in one cylindrical body, so that any one of the optical fibers will be maintained on the outside of the bending radius of the optical cable 3 when the optical cable 3 is bent.

In an alternative method, as shown in FIG. 3, a marking or a structural groove location mark 15 is provided on a cover layer 9-1 at the position of a groove 8-1, whereby a cable is positioned so that the groove 8-1 is allowed to be maintained on the outside of the bending radius around each mandrel 2.

Figure 4A:
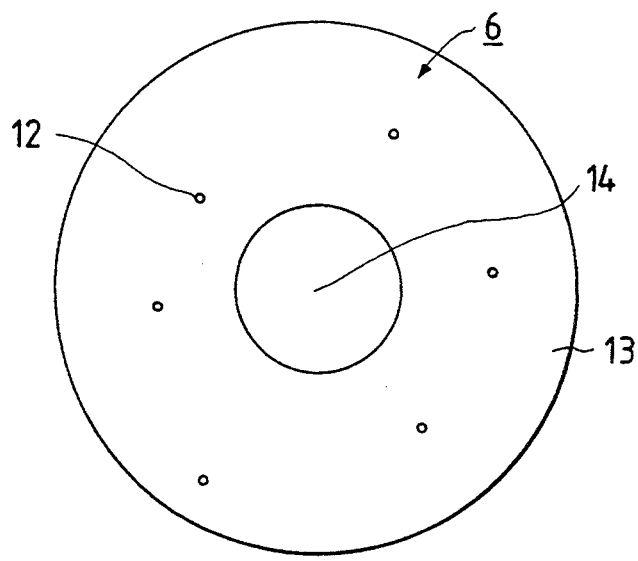
FIGS. 4a and 4b show sectional views of optical fibers applied to the present invention.
Figure 4B:
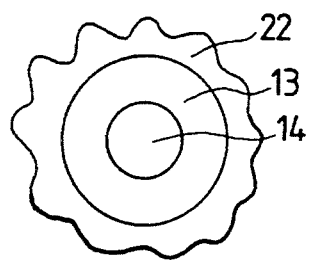
Figure 8:
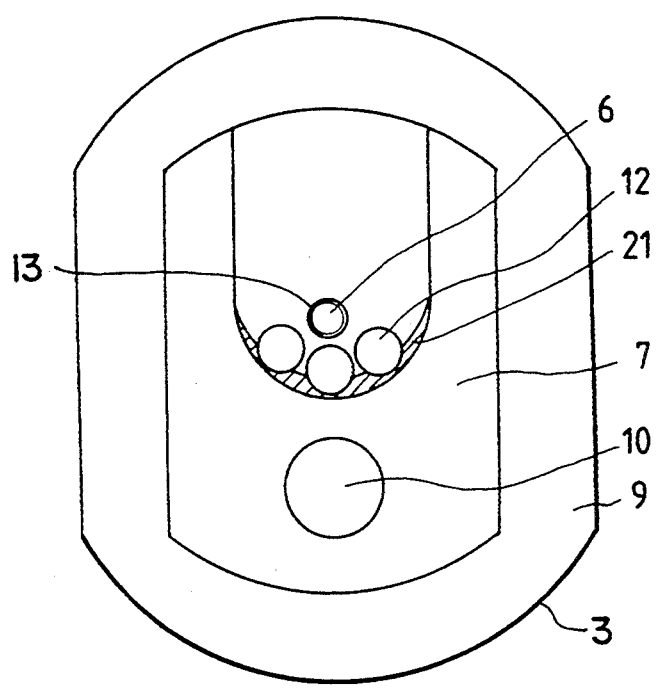
FIG. 8 shows a sectional view of an optical fiber applied to the present invention.

Further, as shown in FIG. 4a, the optical fiber 6 is made such that solid particles 12 are mixed in a coating 13 of a glass fiber 14 so that microbend is generated easily. The solid particles 12 are made of spherical glass, fluorine resin, alumina, or the like. The size of the solid particles 12 is approximately 30 to 50 $\mu$m, and the number thereof included in the coating 13 is approximately 50/mm. The same effect can be obtained if the solid particles 12 are attached to the outer surface of the coating 13 by the use of an adhesive 21 used to maintain the particles in place as shown in FIG. 8, or if unevenness 22 is provided on the outer surface of the coating 13 as shown in FIG. 4b.

Similar to the cover layer 9, resin is used for the coating 13. In order to allow the optical fiber 6 to have excessive length, it is necessary to make the groove 8 larger than the outer diameter of the optical fiber 6. Alternatively, the groove 8 may be shaped so as to be elongated so that the excessive length of the optical fiber 6 may be accommodated by the depth.

Figure 5:
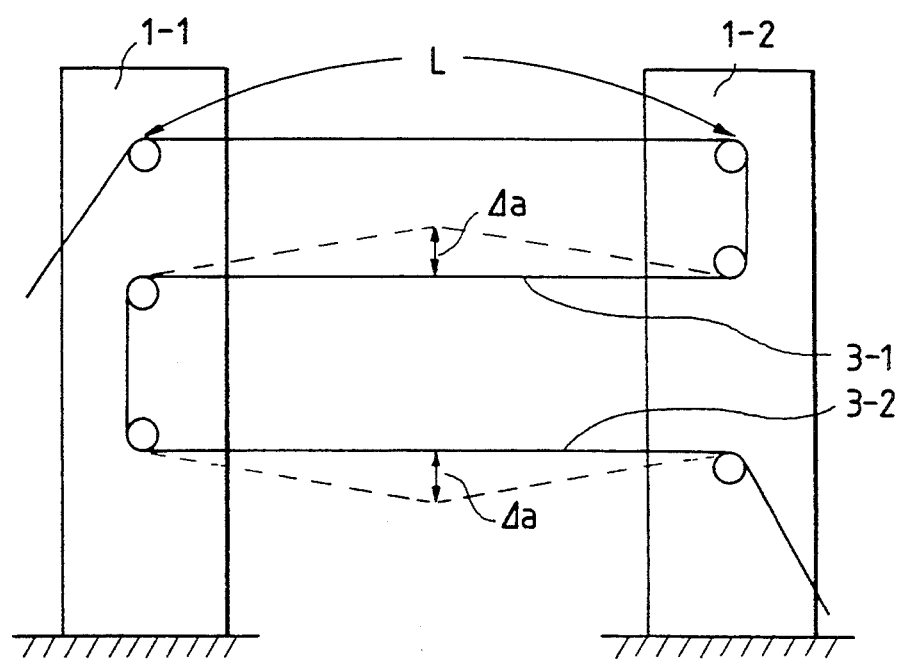
FIG. 5 shows a view for explaining the principle of the present invention.

If a person intends to enter an area encircled by optical cables 3 arranged like a fence through a gap between optical cables 3, it is necessary for that person to enlarge the distance between the optical cables 3 as shown in FIG. 5. Letting the interval between supports 1-1 and 1-2 be L and letting the enlargement of the distance between the optical cables 3-1 and 3-2 be $\Delta a$ per optical cable, then the percent of extension ΔL is expressed in the following Equation (1).

$$\Delta L = (\sqrt{L^2 + 4\Delta a^2} - L)/L \quad (1)$$

Figure 3A:
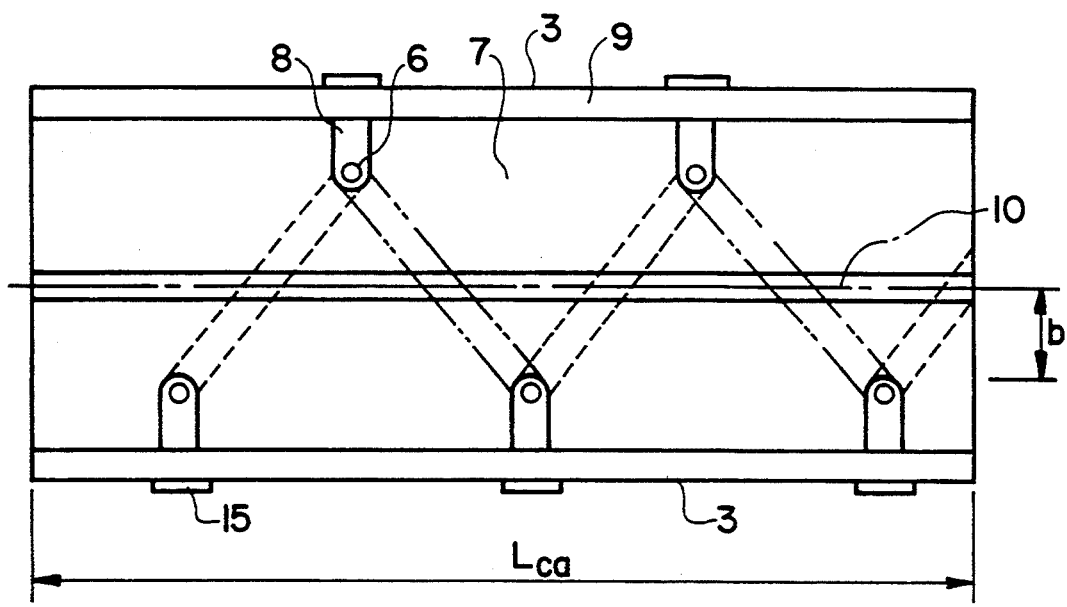
FIG. 3a shows a cut away side view of a length of optical cable with a spiral groove.

On the other hand, the minimum length $L_{MIN}$ of the optical fiber 6 in the groove 8 of the cable 3 is determined by the structure of the cable 3. For example, in a case of an optical fiber 6 in a groove 8 of a cylindrical body 7 longitudinally having a spiral groove as shown in FIG. 3a, the minimum length $L_{MIN}$ of optical fiber 6 which can span the length of the groove 8 can be expressed by the following Equation (2) when the length of the cable 3, the pitch of the spiral groove, and the distance from the cable center to the groove bottom are represented by Lca, P and b, respectively.

$$L_{MIN} = L_{ca}\sqrt{P^2 + 4\pi^2 b^2}/P \quad (2)$$

In the case of a linear groove, $L_{MIN}$ becomes equal to $L_{ca}$.

When an excessive length of optical fiber is received by the groove 8 so that the optical fiber is longer than $L_{MIN}$ by only ΔK. the optical fiber 6 exists freely within the groove 8 when not subjected to lateral pressure. Lateral pressure F is finally applied to the optical fiber 6 from the groove bottom when ΔL>ΔK. This lateral pressure F is expressed by the following Equation (3).

$$F = ES\frac{\Delta L}{L_{MIN}}/R \quad (3)$$

where, E, S and R represent the Young's modulus of the optical fiber 6, the sectional area of the optical fiber 6, and the radius of curvature of the optical fiber 6, respectively, the radius of curvature of the optical fiber 6 being determined by the spiral groove and satisfying the Equation of $R=b+(P/2\pi)^2/b$. Accordingly, the lateral pressure according to the present invention occurs with a threshold.

In the case where the radius of curvature R of the optical fiber 6, determined by the spiral groove, is large, or in the case of a linear groove, the lateral pressure threshold may not be sufficiently obtained. In this case, if mandrels 2 each having a small radius of curvature are attached to the supports 1 and the optical cable 3 winds around the mandrels 2 so that the groove 8 is directed toward the outer circumference of each of the mandrels 2, the lateral pressure threshold is lowered such that when the optical fiber 6 is subjected to a large lateral pressure it generates microbend, which increases the transmission loss of the optical signal.

On the other hand, in the case where the radius of curvature of each mandrel 2 is larger or in the case of no mandrel 2 at all, the lateral force exerted on the cable 3 in a certain section may cause sufficient enough pressure on the optical fiber 6 in the section in question. In this case, it is effective to provide a structure where the optical fiber 6 is fixed with resin or the like in the groove 8 of the cable 3 at intervals substantially equal to those of the supports (preferably, at positions a little before or a little after the respective supports 1).

The cables 3 shown in FIGS. 2 and 3 are of a concentric type that has the copper wire 10 positioned in the center of the cable, however, the cable may be an eccentric type where the copper wire is not in the center of the cable, as shown in FIG. 8.

EXAMPLE 1

Figure 6:
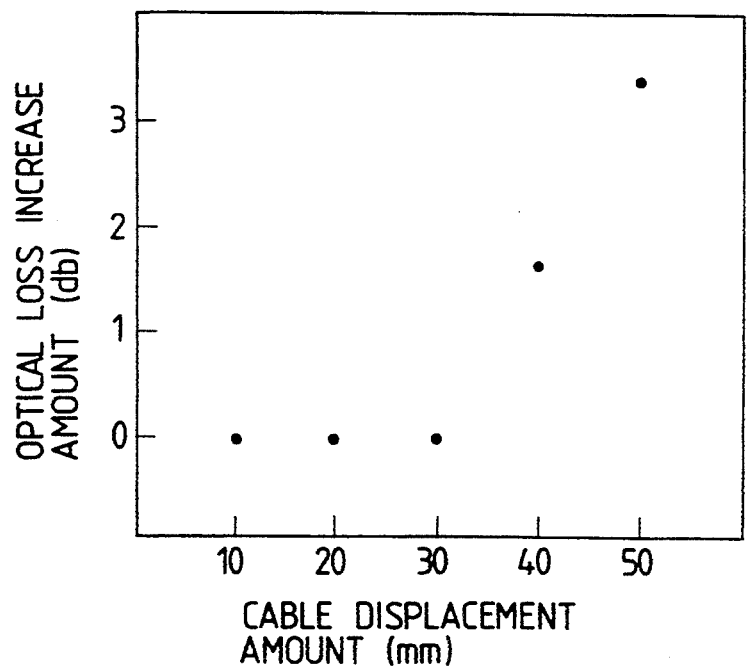
FIGS. 6 and 7 show the measured values of the results obtained by the examples of the present invention.

In the cable structure shown in FIG. 3, an optical fiber 6-1 with an excessive length of 0.05% of the minimum length thereof was received in a spiral groove 8-1 to thereby form a cable 3. The cable 3 was attached on supports 1 provided at intervals of 2 m through mandrels 2 of 35 mm in diameter attached to the supports 1 in such a manner that the groove 8 was directed toward the outer circumference of each mandrel 2. Light of 1.55 μm in wavelength was transmitted through the optical fiber 6, and the cable 3 at the intermediate portion between the supports 1 was displaced from 0 to 50 mm while the quantity of light reception was being detected at the other end of the optical fiber 6. As shown in FIG. 6, the loss caused by the displacement of the cable 3 and the microbend in the optical fiber due to the displacement of the cable 3 did not increase the light loss through the range of 0 to 35 mm, while the light loss showed a tendency to increase relative to the displacement beyond the above range.

EXAMPLE 2

Figure 7:
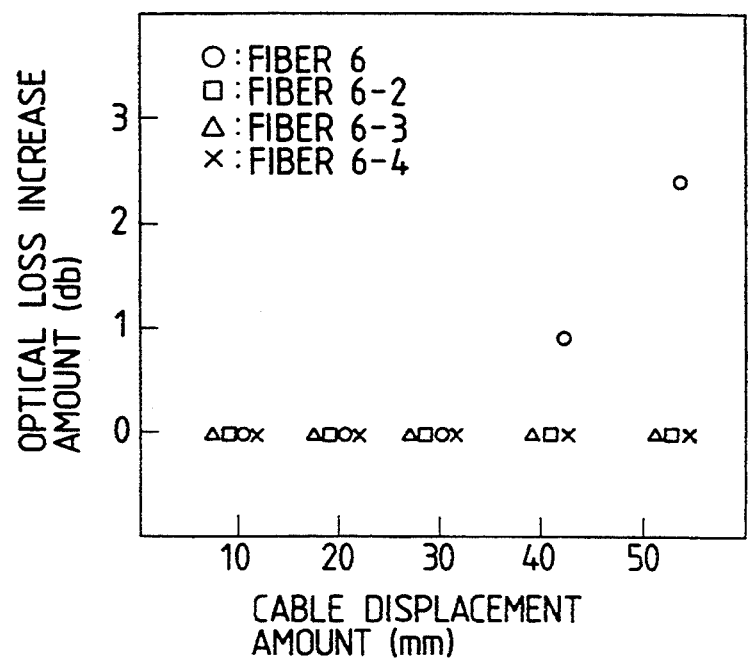

Four optical fibers 6, 6-2, 6-3 and 6-4 were received in respective spiral grooves under the conditions similar to those in the Example 1 to form a cable 3 as shown in FIG. 2, and similar measurement was performed. As a result, as shown in FIG. 7, the light loss through the optical fiber 6 had a tendency to increase as in Example 1, while at the same time no increase of loss occurred in the other three optical fibers 6-2, 6-3 and 6-4. This was considered to be because only the optical fiber 6 was attached in the radially outer side of the mandrel 2.

In the security system using the present invention, the change of loss shows a threshold behavior which depends upon the force exerted onto the cable or the quantity of expansion of the distance between the cable portions. Accordingly, in only the case where sufficiently large force is exerted will the system detect the optical loss, thereby avoiding false intrusions cause by a fine displacement of the cable due to wind pressure, temperature change, or the like.

What is claimed is:

1. A security system comprising:
   a cable having a groove therein to accommodate an optical fiber having a length in excess of the minimum length required to reach both ends of said cable in said groove therein, said optical fiber having a length in excess of the minimum length required to reach both ends of said cable being accumulated within said groove;
   a cover over said cable to contain said optical fiber within said groove;
   a light transmitter for applying an optical signal into one end of said cable, said optical signal being transmitted in said optical fiber;
   a plurality of supports having mandrels for supporting said cable, said cable being provided between said supports and looped around said mandrels such that a change in tension applied to said cable alters an optical propagation through said optical fiber; and
   a light receiver at the other end of said cable for receiving said optical signal after said optical signal propagates through said cable so as to detect said loss in said optical signal, the loss in said optical signal being a function of said change in tension applied to said cable.

2. A security system comprising:
a cable having first and second ends, said cable comprising:
i.) a cylindrical body having a plurality of linear grooves formed in a surface thereof;
ii.) an optical fiber accommodated within any one of said grooves, said optical fiber having a coating layer and a length in excess of the minimum length required to reach both ends of said cylindrical body;
iii.) a cover surrounding said cylindrical body to contain said optical fiber within said accommodating groove;
a light transmitter for applying an optical signal to said first end of said cable;
a light receiver at said second end of said cable for receiving said optical signal after it propagates through said cable; and
a plurality of supports having mandrels, said cable being looped around said mandrels and provided between said supports in a manner such that disturbing said cable changes a tension of said cable which alters optical propagation therethrough.

3. A security system as claimed in claim 2, wherein a groove location mark is provided on said cover marking the position of one of said plurality of linear grooves.

4. A security system as claimed in claim 3, wherein said cable is provided between said plurality of supports such that said groove location mark is positioned away from contact with said mandrels when said cable is looped around said mandrels.

5. A security system comprising:
a cable having first and second ends, said cable comprising:
i.) a cylindrical body having a plurality of spiral grooves formed in a surface thereof;
ii.) an optical fiber accommodated within said grooves, said optical fiber having a coating layer and a length in excess of the minimum length required to reach both ends of said cylindrical body;
iii.) a cover surrounding said cylindrical body to contain said optical fiber within said grooves;
a light transmitter for applying an optical signal to said first end of said cable;
a light receiver at said second end of said cable for receiving said optical signal after it propagates through said cable; and
a plurality of supports having mandrels, said cable being looped around said mandrels and provided between said supports in a manner such that disturbing said cable changes a tension of said cable which alters optical propagation therethrough.

6. A security system as claimed in claim 5, wherein a groove location mark is provided on said cover marking the position of one of said plurality of spiral grooves.

7. A security system as claimed in claim 6, wherein said cable is provided between said plurality of supports such that said groove location mark is positioned away from contact with said mandrels when said cable is looped around said mandrels.

8. A security system comprising:
a cable having first and second ends, said cable comprising:
i.) a cylindrical body having a groove with a rough surface therein;
ii.) an optical fiber accommodated within said groove, said optical fiber having a length in excess of the minimum length required to reach both ends of said cable;
iii.) a cover surrounding said cylindrical body to contain said optical fiber within said groove;
a light transmitter for applying an optical signal to said first end of said cable; and
a light receiver at said second end of said cable for receiving said optical signal after it propagates through said cable; and
a plurality of supports having mandrels, said cable being looped around said mandrels and provided between said supports in a manner such that disturbing said cable changes a tension of said cable which alters optical propagation therethrough.

9. A security system comprising:
a cable having first and second ends, said cable comprising:
i.) a cylindrical body having a groove therein;
ii.) an optical fiber accommodated within said groove., said optical fiber having a length in excess of the minimum length required to reach both ends of said cylindrical body, said optical fiber comprising a glass fiber with a coating layer containing solid particles therein, said coating layer covering said glass fiber;
iii.) a cover surrounding said cylindrical body to contain said optical fiber within said groove;
a light transmitter for applying an optical signal to said first end of said cable;
a light receiver at said second end of said cable for receiving said optical signal after it propagates through said cable; and
a plurality of supports having mandrels, said cable being looped around said mandrels and provided between said supports in a manner such that disturbing said cable changes a tension of said cable which alters optical propagation therethrough.

10. A security system comprising:
a cable having first and second ends, said cable comprising:
i.) a cylindrical body having a groove therein;
ii.) an optical fiber accommodated within said groove, said optical fiber having a length in excess of the minimum length required to reach both ends of said cylindrical body, said optical fiber comprising a glass fiber with a coating layer having a rough outer surface, said coating layer covering said glass fiber;
iii.) a cover surrounding said cylindrical body to contain said optical fiber within said groove;
a light transmitter for applying an optical signal to said first end of said cable;
a light receiver at said second end of said cable for receiving said optical signal after it propagates through said cable; and
a plurality of supports having mandrels, said cable being looped around said mandrels and provided between said supports in a manner such that disturbing said cable changes a tension of said cable which alters optical propagation therethrough.

11. A cable for use in a security system comprising:
a cylindrical body having a groove therein, said groove having a length and said cylindrical body having a cylindrical center;
an optical fiber having first and second ends accommodated within said groove, said optical fiber having a length in excess of said length of said groove, said optical fiber having a coating with a rough surface applied thereto so as to facilitate the effects of microbend in said optical fiber;

a cover layer surrounding said cylindrical body, said cover layer having an outside;

a light transmitter for projecting an optical signal on said first end of said optical fiber; and a light receiver at said second end of said optical fiber for detecting said optical signal projected on said first end of said optical fiber;

wherein said cable is provided between a plurality of supports having mandrel means attached thereto so that when a tension above a predetermined threshold amount is applied to said cable, an optical transmission loss is detected by said light receiver indicating a physical contact with said cable.

12. A cable for use in a security system as claimed in claim 11, wherein said cover layer contains solid particles therein.

13. A cable for use in a security system as claimed in claim 11, wherein said cable contains a reenforcing wire incorporated within the substance of said cylindrical body for increasing the tensile strength of said cable.

14. A cable for use in a security system as claimed in claim 11, wherein said length of said optical fiber is about 0.05 percent in excess of said length of said groove.

15. A cable for use in a security system as claimed in claim 11, wherein said groove is straight with respect to the length of said cable.

16. A cable for use in a security system as claimed in claim 11, wherein said groove loops around said cylindrical body with respect to the length of said cable.

17. A cable for use in a security system as claimed in claim 15, wherein a groove location mark is provided on said outside of said cover layer at a position along said groove.

18. A cable for use in a security system as claimed in claim 16, wherein a groove location mark is provided on said outside of said cover layer at a position along said groove.

* * * * *